US008318272B1

(12) United States Patent
Maltar

(10) Patent No.: US 8,318,272 B1
(45) Date of Patent: Nov. 27, 2012

(54) DECORATIVE TUBULAR ART FORM AND METHOD OF ASSEMBLY THEREOF

(76) Inventor: Ratko Maltar, Cleveland, OH (US)

( * ) Notice: Subject to any disclaimer, the term of this patent is extended or adjusted under 35 U.S.C. 154(b) by 109 days.

(21) Appl. No.: 12/857,296

(22) Filed: Aug. 16, 2010

(51) Int. Cl.
*B29D 22/00* (2006.01)

(52) U.S. Cl. .................................... 428/34.2; 428/542.2

(58) Field of Classification Search ................. 428/34.3, 428/542.2, 906, 34.2; 403/217, 219, 202, 403/170, 17; 446/85–128
See application file for complete search history.

(56) References Cited

U.S. PATENT DOCUMENTS

| | | | | |
|---|---|---|---|---|
| 4,021,950 | A | 5/1977 | Asija | |
| 5,032,437 | A | 7/1991 | Tourlentes | |
| 5,236,748 | A | 8/1993 | Cheng | |
| 5,365,684 | A | 11/1994 | Cartmell | |
| 5,690,446 | A * | 11/1997 | Poissant et al. | 403/361 |
| 6,248,426 | B1 | 6/2001 | Olson et al. | |
| 6,679,644 | B1 * | 1/2004 | Heller | 403/220 |

OTHER PUBLICATIONS

Definition of Acetate Paper (www.about.com).*

* cited by examiner

*Primary Examiner* — Rena Dye
*Assistant Examiner* — Yan Lan
(74) *Attorney, Agent, or Firm* — Montgomery Patent & Design, LLC; Robert C. Montgomery; Joseph Yaksich

(57) ABSTRACT

A system and method by which new or recycled paper is rolled and assembled to form artwork is herein disclosed. The art form comprises a plurality of pre-rolled or flat pieces of paper that are rolled and formed into tubes. These tubes are then taped to hold them together, and if desired, folded inwardly at end portions for aesthetic purposes. Next, the tubes are arranged in a two-layer matrix forming an initial panel and secured using plastic wire ties. The panels are then layered and joined using the wire ties to form various finished designs. When completed, the art assembly comprises various abstract pieces of art being flat, non-flat, three-dimensional, or the like, that can be hung on a wall, stood upon a floor, or suspended from a ceiling. It is envisioned that the art form may be provided using recycled paper from catalogues and magazines to provide lively colors and brightly colored pattern that is also ecologically friendly. It is envisioned that the art form is to be sold in a kit format with the paper in a flat form to be rolled by the final user. The kit would be packaged with a suitable number of wire ties, common adhesive tape, and instructions for producing one (1) or more pieces of artwork.

8 Claims, 2 Drawing Sheets

DECORATIVE TUBULAR ART FORM AND METHOD OF ASSEMBLY THEREOF

RELATED APPLICATIONS

The present invention was first described in a notarized Official Record of Invention on Jun. 18, 2007, that is on file at the offices of Montgomery Patent and Design, LLC, the entire disclosures of which are incorporated herein by reference.

FIELD OF THE INVENTION

The present invention relates generally to a system and method by which new or recycled paper stock is rolled and assembled to form artwork and, more particularly, to said system comprising a plurality of pre-rolled or flat pieces of paper stock that are rolled and formed into tubes and secured, arranged in a two (2) layer matrix forming an initial panel and secured using plastic wire ties, and layered and joined using the wire ties to form various finished designs.

BACKGROUND OF THE INVENTION

Interior decorating incorporates a wide variety of styles, borrowing ideas from cultures across the globe in order to achieve a unique signature style for the home or office being decorated. For those who are on the cutting edge of modern interior decorating practices, they know all too well that interior design is susceptible to the same type of trends or cyclical popularity as that experienced in the fashion world and other areas. In response to this constant evolution of interior design methods, interior designers and manufacturers of interior design articles are constantly in need of new and innovative ideas. As wall hangings are often the centerpieces of interior design around which the decor of a room is focused, ideas relating to new designs are held at a premium. Accordingly, there is a constant need for new and innovative wall hanging decorations that will afford interior designers and homeowners alike the ability to achieve a popular, yet unique decorative room appearance. The development of the system described herein fulfills this need.

Art encompasses the transformation of the ordinary into something extraordinary. The present invention incorporates that common piece of paper and transforms it into a three dimensional work of art that is limited only by the creativity of the artist. What is disclosed here is a new artistic medium for sculpture.

There have been attempts in the past to develop new artistic media. U.S. Pat. No. 6,248,426 issued to Olson et al discloses the use of construction paper to construct a three-dimensional shape. Unfortunately, this patent does not appear to disclose the use of common paper stock for the formation of tubular units that are then attached and formed so as to create colorful and varied artistic designs.

U.S. Pat. No. 5,365,684 issued to Cartmell discloses a method of constructing an origami-style foldable picture frame from a blank of sheet material. Unfortunately, this patent does not appear to disclose a decorative tubular art form or method with many applications beyond that of a picture frame.

U.S. Pat. No. 5,236,748 issued to Cheng discloses a method of forming flower decoration and a wrinkled paper flower decoration. Unfortunately this patent likewise, does not appear to disclose a decorative tubular art form or method with many applications beyond that of a picture frame.

U.S. Pat. No. 5,032,437 issued to Tourentes discloses jewelry and methods for making jewelry and other decorative devices utilizing tubular forms arranged into ladder like structures. Unfortunately, this patent does not appear to disclose the use of tubular forms that are latticed into panels that form colorful and varied designs and art forms.

U.S. Pat. No. 4,021,950 issued to Asija discloses what appears to be an origami crafted exhibit device. Unfortunately, this patent does not appear to disclose the use of common paper stock for the formation of tubular units that are then attached and formed so as to create colorful and varied artistic designs.

None of the prior art particularly describes a system and method by which new or recycled paper stock is rolled and assembled to form artwork that the instant system possesses. Accordingly, there exists a need for new and innovative wall hanging decorations that will afford interior designers and homeowners alike the ability to achieve a popular, yet unique decorative room appearance that operates without the disadvantages as described above.

SUMMARY OF THE INVENTION

In light of the disadvantages as described above in the prior art, it is apparent that there is a need for a decorative tubular paper art form and method of assembly which comprises new or recycled paper being rolled and formed into artwork.

An object of the decorative tubular art form and method of assembly thereof permits a user to create any art form and any number of various designs having different sizes, shapes, thicknesses, colors, patterns allowing a user to create various objects such as, but not limited to: random patterns, animal shapes, various figures, geometric shapes, and alpha-numeric symbology.

Another object of the decorative tubular art form when completed forms various abstract pieces of art that may be hung on a wall, placed upon a floor, or suspended from a ceiling.

A further object of the decorative tubular art form is provided with the paper tubes either pre-rolled or sold as flat sheets of paper stock that are rolled by an end user.

Still a further object of the decorative tubular art form comprises utilizing paper stock in a variety of colors and/or patterns for arranging the paper tubes, thereby resulting in an assembled panel having desired accumulative colored patterns, geometry, images, or the like.

Another object of the decorative tubular art form is the use of identical paper stock that results in a sequence of incremental deviation between adjacent tubes producing another artistic effect.

Yet another object of the decorative tubular art form comprises partial or complete use of recycled paper stock from newspapers, magazines, catalogs, or acetate paper, or other similar materials, thereby providing desired artistic effects while also being ecologically friendly.

Yet still another aspect of the decorative tubular art form is provided in a kit format comprising sheets of paper stock, wire ties, common adhesive tape, and instructions for producing one (1) or more pieces of finished artwork.

An aspect of the decorative tubular art form and method comprises a plurality of paper tubes, a plurality of wire ties, and a pair of panels.

Another aspect of the decorative tubular art form comprises a plurality of paper tubes that further comprise a single sheet of paper stock, a strip of adhesive tape, and a single assembled panel. The paper tube is formed by rolling a single sheet of paper stock resulting in a sturdy structural element and then is secured using one (1) strip of adhesive tape.

A further aspect of the decorative tubular art form comprises paper tubes affixed thereto one (1) another using wire ties forming a two-level assembled panel or other various panel design. The paper tubes may be utilized to form a panel comprising patterns such as, but not limited to: parallel, spiral, end-to-end, or the like to form a solid, open, crisscross, or polygonal-shaped panel.

Still another aspect of the decorative tubular art form comprises wire ties that provide an attachment means between two (2) or more panels producing a finished work of art.

A method of utilizing the decorative tubular art form and method thereof may be achieved by performing the following steps: purchasing a particular model of the system containing desired artistic features and a sufficient quantity of paper stock required to complete an art project; rolling each sheet of paper stock forming the paper tube; securing the paper tube by wrapping one (1) or more strips of adhesive tape around; trimming an end portion of the paper tube, if desired; folding end portions of the paper tube inwardly, if desired; repeating the rolling and taping of paper tubes until obtaining a desired quantity; arranging said paper tubes into desired patterns and layers so as to form a panel; securing the panel design using the wire ties; repeating the assembly of a desired number of panels; assembling the panels together using the wire ties to complete a finished work of art; and, enjoying unlimited creation of finished artistic designs providing a variety of forms and desired visual effects using the present invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | decorative tubular paper art form |
| 20 | paper stock |
| 25 | paper tube |
| 30 | adhesive tape strip |
| 35 | wire ties |
| 40 | panel |
| 45 | border |

DETAILED DESCRIPTION OF THE PREFERRED EMBODIMENT

Figure 1:
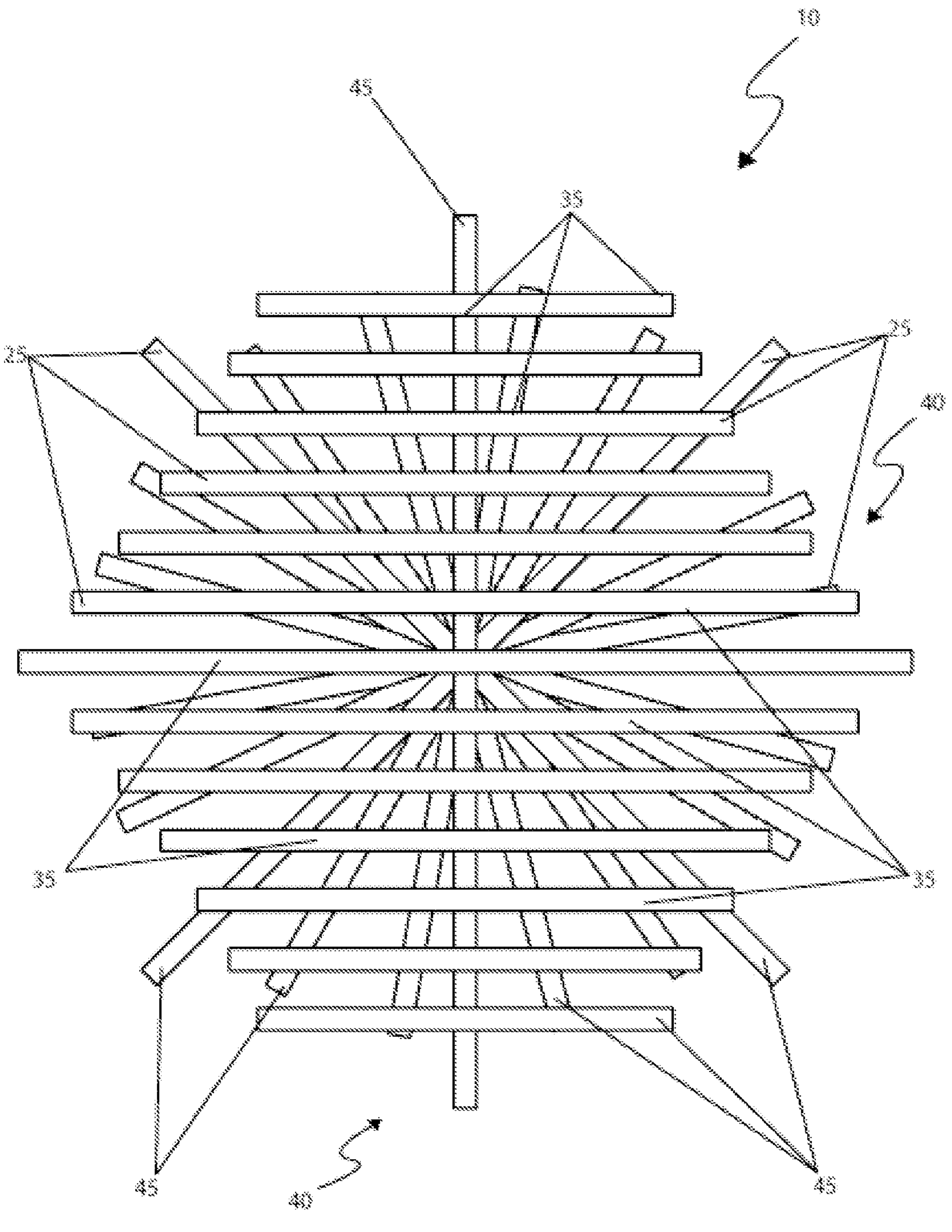
FIG. 1 is a front view of a decorative tubular paper art form and method of assembly thereof 10 depicting a finished assembly, according to a preferred embodiment of the present invention; and, FIG. 2 is an assembly sequence diagram of a decorative tubular paper art form and method of assembly thereof 10, according to a preferred embodiment of the present invention.
Figure 2:
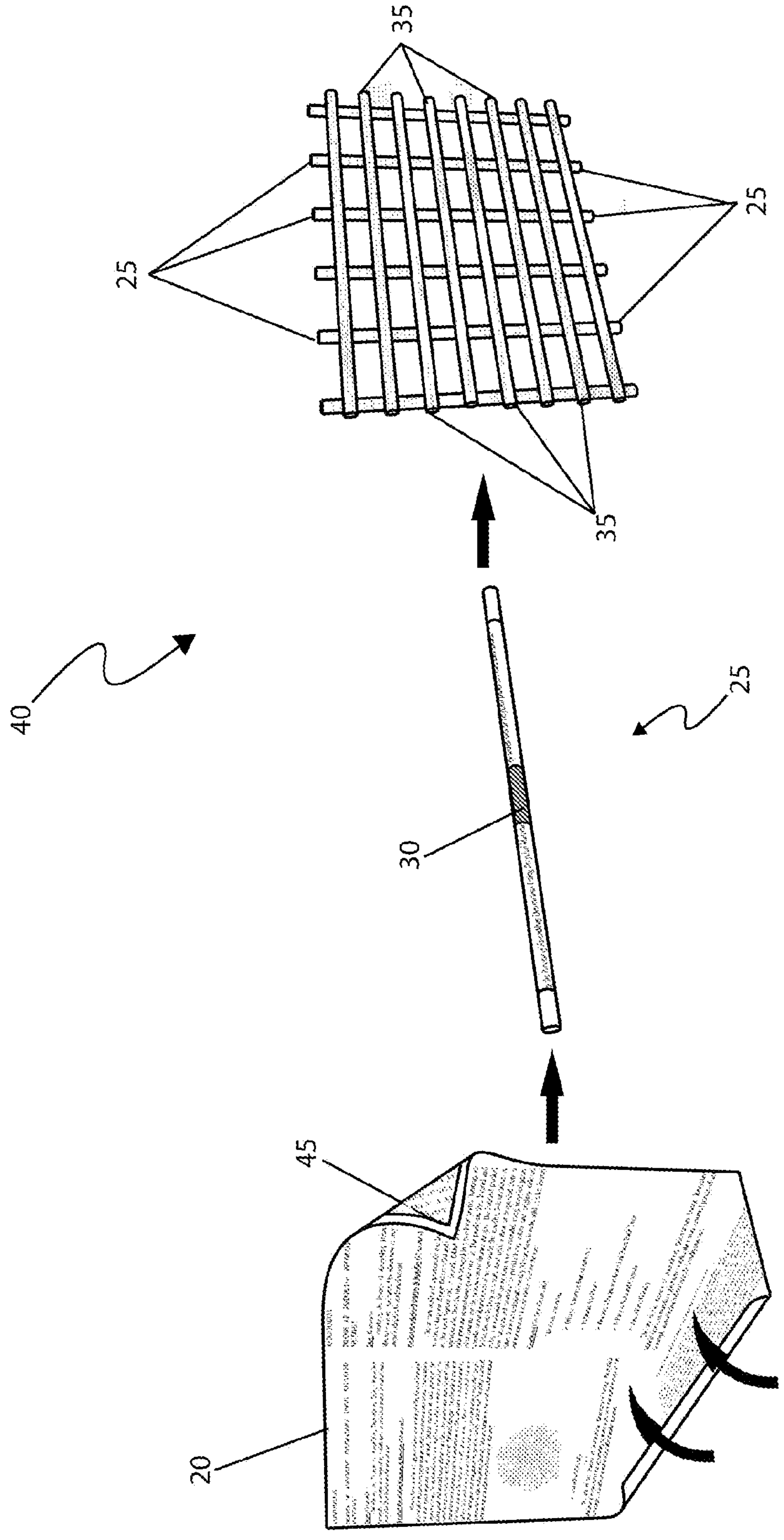

The best mode for carrying out the invention is presented in terms of its preferred embodiment, herein depicted within FIGS. 1 and 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a decorative tubular paper art form and method of assembly thereof (herein described as the "system") 10, which comprises new or recycled paper being rolled and formed into artwork. The system 10 comprises a plurality of recycled paper sheets 20 that are rolled into paper tubes 25. The tubes 25 are then held in place using common adhesive tape and folded inwardly at end portions if desired for appearance sake. Next, the tubes 25 are arranged in a 2-layer matrix to form a panel 40 being secured using plastic wire ties 35. One (1) or more panels 40 are then layered and joined using the wire ties 35 to form various finished designs. When completed, the system 10 forms various abstract pieces of art that may be hung on a wall, placed upon a floor, or suspended from a ceiling.

Referring now to FIG. 1, a front view of the system 10 depicting a finished assembly, according to the preferred embodiment of the present invention, is disclosed. The system 10 is illustrated here in a form of a finished work of art; however, it is understood that like any art form, a user is free to create any number of various designs having different sizes, shapes, thicknesses, colors, patterns allowing a user to create various objects such as, but not limited to: random patterns, animal shapes, various figures, geometric shapes, alpha-numeric symbology, and the like. It is envisioned that the border 45 of the paper stock 20 pre-printed features which upon being rolled thereinto a tube 25, may form a variety of visual effects individually and as a plurality of like tubes 25. The system 10, as illustrated here, comprises a plurality of paper tubes 25, a plurality of wire ties 35, and a pair of panels 40. The paper tubes 25 comprise tubular forms of varying length and diameter so as to enable a user to create designs having various perimeter shapes. The paper tubes 25 may be utilized to form a panel 40 being arranged along one (1) or more levels comprising patterns such as, but not limited to: parallel, spiral, end-to-end, or the like to form a solid, open, crisscross, or polygonal-shaped panel 40. The paper tubes 25 are then secured thereto one another, thereby retaining a design of the created panel 40 using a plurality of wire ties 35 being positioned therealong adjacent paper tubes 25 being in relative position thereto one another or at intersecting points of two (2) or more tubes 25. Finally, the wire ties 35 provide an attachment means therebetween two (2) or more panels 40, thereby producing a finished work of art. It is envisioned that the system 10 may be sold in a kit format comprising approximately one-hundred-fifty (150) to two-hundred (200) sheets of paper stock 20 and packaged together with a suitable number of wire ties 35, common adhesive tape, and instructions for producing one (1) or more pieces of finished artwork. It is further envisioned that the system 10 could be sold with the paper tubes 25 either pre-rolled or sold as flat sheets of paper stock 20 being rolled by a final user.

It is also understood when assembled therein finished art pieces, the system 10 may be scanned, animated, and utilized for various presentations and/or broadcasting purposes.

Referring now to FIG. 2, an assembly sequence diagram of the system 10, according to the preferred embodiment of the present invention, is disclosed. The system 10 comprises a single sheet of paper stock 20, a strip of adhesive tape 30, and a single assembled panel 40. The paper tube 25 is formed by rolling a single sheet of paper stock 20 preferably beginning therefrom a single corner portion and proceeding diagonally in such a way as to accumulate multiple circular layers of the paper stock 20 resulting in a sturdy structural element. The use of identical paper stock 20 is envisioned to result in a sequence of incremental deviation therebetween adjacent tubes 25, thereby producing yet another artistic effect. The paper tube 25 may then be secured using one (1) strip of common adhesive tape 30. Finally, the paper tube 25 may be trimmed to a particular length if desired and end portions may be folded inwardly to provide an aesthetic appearance if desired. The paper tubes 25 are illustrated here being affixed thereto one another using wire ties 35 along intersecting portions of adjacent paper tubes 25 forming a two-level assembled panel 40; however, it is understood that said paper tubes 25 may be arranged to form various panel designs 40 utilizing design characteristics such as, but not limited to: multiple layers, multi-colored designs, patterns, densely arranged parallel paper tubes 25 forming a solid panel 40, spirally arranged paper tubes 25, randomly arranged paper tubes 25, and combinations of the aforementioned characteristics. It is also understood that the paper stock 20 may also provide a variety of colors and/or patterns which may be utilized therein the arrangement of the paper tubes 25 resulting in an assembled panel 40 having desired accumulative colored patterns, geometry, images, or the like, based upon a user's preference.

It is envisioned that the system 10 may partially or completely comprise of recycled paper stock 20 originating therefrom newspapers, magazines, catalogs, or acetate paper, or other similar materials, thereby providing desired artistic effects while also being ecologically friendly.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be utilized as indicated in FIG. 1.

The method of utilizing the system 10 may be achieved by performing the following steps: purchasing a particular model of the system 10 containing desired artistic features and a sufficient quantity of paper stock 20 required to complete an art project; rolling each sheet of paper stock 20, thereby forming the paper tube 25; securing the paper tube 25 by wrapping one (1) or more strips of adhesive tape 30 therearound; trimming an end portion of the paper tube 25, if desired; folding end portions of the paper tube 25 inwardly, if desired; repeating the rolling and taping of paper tubes 25 until obtaining a desired quantity; arranging said paper tubes 25 thereinto desired patterns and layers so as to form a panel 40; securing the panel 40 design using the wire ties 35; repeating the assembly of a desired number of panels 40; assembling the panels 40 theretogether using the wire ties 35 to complete a finished work of art; and, enjoying unlimited creation of finished artistic designs providing a variety of forms and desired visual effects using the present invention 10.

An alternative embodiment of the present invention 10 comprises a combining and packaging of the system 10 with other decorative art forms such as, but not limited to: canvas paintings, wall hangings, decorative lighting, or the like.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A decorative paper art form system, comprising:

a plurality of paper stock rolled into a plurality of elongated tubes and secured into said plurality of tubes by an adhesive means, each of said tubes comprising a first end and an opposed second end;

wherein tubes are attached to adjacent tubes at an angle by wire ties fastened around tube intersecting points between said first and second ends such that said plurality of tubes form a two-dimensional panel; and, wherein a plurality of two-dimensional panels is attached by said wire ties fastened around panel intersecting points between said first and second ends of said tubes defining a sequence of incremental deviation between adjacent layers of two-dimensional panels.

2. The system of claim 1, wherein said adhesive means comprises an adhesive tape.

3. The system of claim 1, wherein said plurality of paper stock comprises a variety of pre-printed features to form a variety of visual effects on an exterior surface of each of said plurality of tubes.

4. The system of claim 1, wherein said plurality of tubes comprises a variety of lengths and diameters.

5. The system of claim 1, wherein said plurality of paper stock is pre-rolled.

6. The system of claim 1, wherein said plurality of paper stock comprises a recycled material.

7. The system of claim 6, wherein said recycled material comprises newspapers, magazines, or catalogs.

8. The system of claim 1, wherein said plurality of paper stock comprises an acetate paper.

* * * * *